(12) United States Patent
Regnier

(10) Patent No.: US 9,884,470 B2
(45) Date of Patent: Feb. 6, 2018

(54) LAMINATE STRUCTURE INCLUDING A PRIMER COATING THEREIN

(71) Applicant: Michelman, Inc., Cincinnati, OH (US)

(72) Inventor: Baptiste Regnier, Thionville (FR)

(73) Assignee: Michelman, Inc., Cincinnati, OH (US)

( * ) Notice: Subject to any disclaimer, the term of this patent is extended or adjusted under 35 U.S.C. 154(b) by 514 days.

(21) Appl. No.: 14/302,819

(22) Filed: Jun. 12, 2014

(65) Prior Publication Data

US 2014/0370252 A1    Dec. 18, 2014

Related U.S. Application Data

(60) Provisional application No. 61/836,414, filed on Jun. 18, 2013.

(51) Int. Cl.
*B32B 27/36* (2006.01)
*B32B 27/32* (2006.01)
(Continued)

(52) U.S. Cl.
CPC ............... *B32B 27/36* (2013.01); *B32B 7/12* (2013.01); *B32B 27/08* (2013.01); *B32B 27/16* (2013.01); *B32B 27/32* (2013.01); *B32B 27/34* (2013.01); *B32B 37/185* (2013.01); *B32B 38/145* (2013.01); *B32B 38/0008* (2013.01); *B32B 2037/243* (2013.01); *B32B 2255/10* (2013.01); *B32B 2255/205* (2013.01); *B32B 2255/24* (2013.01); *B32B 2255/26* (2013.01);
(Continued)

(58) Field of Classification Search
None
See application file for complete search history.

(56) References Cited

U.S. PATENT DOCUMENTS 3,909,469 A  †  9/1975  Miller
4,614,762 A      9/1986  Marans et al.
(Continued)

FOREIGN PATENT DOCUMENTS

GB    2335870 A    6/1999
JP   10129111 A    5/1998
(Continued)

OTHER PUBLICATIONS

Communication under Article 94(3) pertaining to European Patent Application No. 14736218.0, dated Sep. 18, 2015.
(Continued)

*Primary Examiner* — Bruce H Hess
*Assistant Examiner* — Sathavaram I Reddy
(74) *Attorney, Agent, or Firm* — Dinsmore & Shohl LLP

(57) ABSTRACT

A laminate structure is provided which includes a first polymeric substrate laminated to a second polymeric substrate. A primer coating comprising the reaction product of polyethyleneimine and formaldehyde is included on the surface of the first polymeric substrate which is subsequently printed with an ink or toner image prior to lamination to the second polymeric substrate. The primer coating provides good toner and/or ink adhesion to the polymeric substrate. The primer coating also provides improved bond strength upon lamination of the first and second polymeric substrates as well as providing water resistance to the laminate structure.

23 Claims, 4 Drawing Sheets

(51) Int. Cl.
*B32B 38/08* (2006.01)
*B32B 37/18* (2006.01)
*B32B 37/15* (2006.01)
*B32B 38/00* (2006.01)
*B32B 27/08* (2006.01)
*B32B 37/24* (2006.01)
*B32B 7/12* (2006.01)
*B32B 27/16* (2006.01)
*B32B 27/34* (2006.01)
*B41M 5/00* (2006.01)
*B41M 5/50* (2006.01)
*B41M 5/52* (2006.01)

(52) U.S. Cl.
CPC ... *B32B 2255/28* (2013.01); *B32B 2307/4023* (2013.01); *B32B 2307/518* (2013.01); *B32B 2309/14* (2013.01); *B32B 2323/04* (2013.01); *B32B 2323/10* (2013.01); *B32B 2367/00* (2013.01); *B32B 2439/00* (2013.01); *B32B 2439/70* (2013.01); *B32B 2457/20* (2013.01); *B41M 5/0011* (2013.01); *B41M 5/508* (2013.01); *B41M 5/52* (2013.01); *B41M 5/5263* (2013.01); *Y10T 156/10* (2015.01); *Y10T 428/24802* (2015.01); *Y10T 428/24851* (2015.01)

(56) References Cited

U.S. PATENT DOCUMENTS

| | | | |
|---|---|---|---|
| 5,156,904 A | | 10/1992 | Rice et al. |
| 5,453,326 A | | 9/1995 | Siddiqui |
| 5,834,098 A | | 11/1998 | Kitamura et al. |
| 6,153,305 A | † | 11/2000 | Uemura |
| 6,436,225 B1 | † | 8/2002 | Papsin, Jr. |
| 6,514,660 B1 | | 2/2003 | Majumdar et al. |
| 6,881,492 B2 | | 4/2005 | Rao et al. |
| 7,470,736 B2 | | 12/2008 | Cooper |
| 2002/0146559 A1 | | 10/2002 | Touhsaent |
| 2008/0175997 A1 | | 7/2008 | Goldstein et al. |
| 2010/0152351 A1 | | 7/2010 | Li |
| 2010/0178440 A1* | | 7/2010 | Jahromi ............ B32B 27/06 428/34.1 |
| 2010/0272968 A1* | | 10/2010 | Metla ............ C09D 11/08 428/195.1 |
| 2012/0207887 A1* | | 8/2012 | Battersby ............ B32B 27/08 426/127 |
| 2014/0186555 A1 | | 7/2014 | Anil et al. |

FOREIGN PATENT DOCUMENTS

| | | |
|---|---|---|
| JP | 2005503276 A | 2/2005 |
| WO | 02/081203 A1 | 10/2002 |
| WO | 2013051017 A3 | 4/2013 |

OTHER PUBLICATIONS

Patent Examination Report No. 1 dated Sep. 22, 2015 pertaining to Australian Patent Application No. 2014281880.
Office Action dated Dec. 25, 2015 pertaining to Chinese Patent Application No. 201480003274.4.
Patent Examination Report No. 2 dated Apr. 8, 2016 pertaining to Australian Patent Application No. 2014281880.
Second Office Action, dated Aug. 17, 2016 pertaining to Chinese Patent Application No. 201480003274.4.
International Search Report and Written Opinion dated Dec. 19, 2014 relating to International Patent Application No. PCT/US2014/042093, filed Jun. 12, 2014.
Office Action dated Oct. 25, 2016 pertaining to Japanese Patent Application No. 2016-509157.
Preliminary Rejection dated May 11, 2017 pertaining to Korean Patent Application No. 10-2015-7011596.

\* cited by examiner
† cited by third party

LAMINATE STRUCTURE INCLUDING A PRIMER COATING THEREIN

CROSS-REFERENCE TO RELATED APPLICATIONS

This application claims the benefit of U.S. Provisional Application No. 61/836,414, filed Jun. 18, 2013, entitled LAMINATE STRUCTURE. The entire contents of said application is hereby incorporated by reference.

BACKGROUND OF THE INVENTION

Embodiments of the invention relate to a laminate structure for use in a variety of packaging applications, and more particularly, to a laminate structure in which a primer composition is applied to a first polymeric substrate which is subsequently printed with a liquid ink or toner and then laminated to a second polymeric substrate.

Polymeric films such as biaxially oriented polypropylene, biaxially oriented polyethylene terephthalate, or polyester films have been widely used in packaging materials for food, liquids, and toiletries. For such packaging applications, a first polymeric film is often laminated to another polymeric film which may be the same or different from the first polymeric film.

Such films are also often printed with the use of high-speed digital printing machines utilizing liquid or dry toners or inks in electrophotographic systems. In such systems, toner images are formed on a photosensitive drum and then electrically transferred onto an intermediate transfer blanket or belt for printing onto a polymeric film sheet or web. Printers using such toners or inks are commercially available from Hewlett-Packard Company under the trade name HP Indigo. However, as liquid toners do not always transfer well and/or adhere well to polymeric film substrates which are printed using such presses, the substrates are typically coated with a primer to enhance the adhesion of liquid toners thereto.

A number of primers have been developed for use on polymeric film substrates which render the surface of the films more receptive to toners and inks. Typical primers currently in use have been developed based on ethylene-acrylic acid copolymers. One such primer is described in commonly-assigned U.S. Pat. No. 7,470,736.

However, the development of newer, high speed digital presses has presented new challenges to the use of primers with regard to liquid toner and/or ink transfer and adhesion to the polymer substrates. For example, the more recently developed HP Indigo 6000 series of digital presses offer digital printing at about twice the speed of previous Indigo presses. In addition, the HP 20000 digital press is capable of printing a 30-inch (76.2 cm) wide film and the HP 30000 digital press is capable of printing at a 29.5 inch (75.0 cm) width on a variety of substrate types.

Due to the specifications of the liquid toners used in such presses, conventional primers do not provide sufficient toner adhesion to the underlying polymeric substrate. As a result, substrates coated with conventional primers may experience undesirable toner transfer to and adhesion to the substrate as well as resulting in unacceptably low lamination bond strength when the printed film is laminated to another substrate.

Accordingly, there is a need in the art for a primer which provides good toner and/or ink adhesion to polymeric substrates and which provides improved bond strength when used between printed and laminated polymeric substrates.

SUMMARY OF THE INVENTION

Embodiments of the invention meet those needs by providing a laminate structure comprising first and second laminated polymeric substrates in which a primer coating is applied to one or both of the polymeric substrates to provide enhanced toner and/or ink adhesion of images printed thereon. In addition, the primer provides improved bond strength upon lamination of the printed first polymeric substrate to the second polymeric substrate. Additionally, the laminate structure exhibits improved resistance to water infiltration upon exposure to water immersion.

According to one aspect of the invention, a laminate structure is provided comprising first and second polymeric substrates each having first and second major surfaces, where at least one major surface of the first polymeric substrate includes a primer coating thereon comprising the reaction product of polyethyleneimine and formaldehyde. A toner or ink image is printed on the substrate over the primer coating, and the first substrate is laminated to the second polymeric substrate at the surface including the primer composition and the toner or ink image. In one embodiment, the laminate structure includes a laminating adhesive over the toner or ink image to facilitate lamination of the substrates.

According to another embodiment of the invention, a method of forming a laminate structure is provided which comprises providing first and second polymeric substrates each having first and second major surfaces, and applying a primer coating to one major surface of the first polymeric substrate, where the primer coating comprises an aqueous solution of the reaction product of polyethyleneimine and formaldehyde. The method may further include drying the coating. The method further includes printing a toner or ink image on the substrate over the primer coating, and laminating the second polymeric substrate to the surface of the first polymeric substrate containing the primer coating and image thereon.

Optionally, prior to applying the primer coating, the surface of the polymeric substrate may be exposed to a corona discharge treatment.

The method may further include applying a laminating adhesive to the surface of the first polymeric substrate containing the primer coating and image thereon prior to laminating the first and second polymeric substrates. The laminating adhesive may be solventless, solvent-based, or water-based.

The first and second polymeric substrates comprise materials selected from biaxially oriented polyethylene terephthalate (BOPET), polyethylene, biaxially oriented polypropylene (BOPP), coextruded polypropylene (COPP), cast polypropylene (CPP), biaxially oriented nylon (BON), and biaxially oriented polyamide (BOPA). Such substrates may also include a metallized coating thereon. The first polymeric substrate may be the same as the second polymeric substrate, or the first and second substrates may be different. The first or second polymeric substrates may also comprise single layer or multilayer films.

In one embodiment, the primer coating is in aqueous form and comprises from about 5 to about 20% by weight polyethyleneimine, about 0.05 to about 5.0% by weight formaldehyde, and the balance water. The primer composition preferably has a solids content ranging from about 5 to 10% by weight of the total composition. In one embodiment, the primer coating further comprises from about 0.05 to 0.1% by weight of a wetting agent. In another embodiment, the primer coating further comprises from about 0.05 to 0.2% of anti-foaming additives.

Accordingly, it is a feature of embodiments of the invention to provide a laminate structure comprising first and second polymeric laminated substrates, where a primer coating has been applied to the first polymeric substrate, a toner or ink image is printed thereon, and the first substrate is laminated to a second polymeric substrate. The primer composition provides enhanced toner and/or ink adhesion to the first polymeric substrate, and exhibits good bond strength upon lamination of the printed first polymeric substrate to a second substrate. Other features and advantages of the invention will be apparent from the following description and the accompanying drawings.

DETAILED DESCRIPTION

Figure 1:
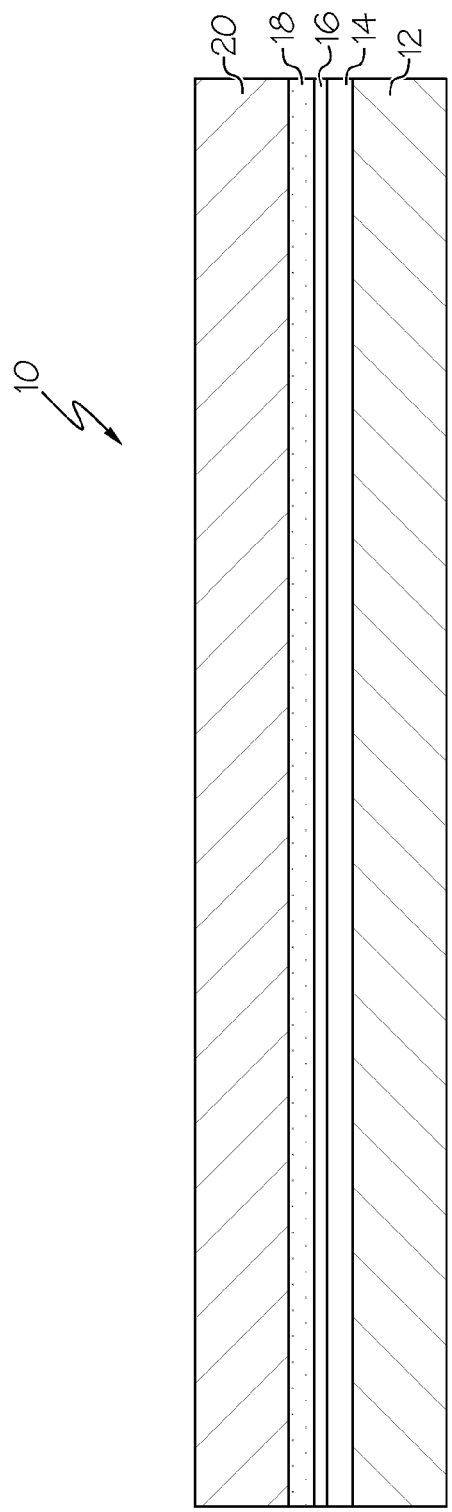
FIG. 1 is a schematic illustration of a laminate structure formed in accordance with an embodiment of the invention.

Embodiments of the laminate structure comprising first and second polymeric substrates including a primer coating thereon as described herein provide improved toner and/or ink adhesion to polymeric substrates. While the invention has been described herein with regard to laminate structures, it should be appreciated that the primer coating may also be applied to polymeric substrates which are subsequently printed but not laminated to take advantage of the enhanced toner/ink adhesion properties provided by the primer.

The primer coating improves ink or toner adhesion for a variety of printing methods and equipment, but especially improves ink or toner adhesion to polymeric substrates which are printed using high speed digital presses such as the HP Indigo WS 6000 series of digital presses or the HP 20000 or 30000 wide format digital presses. By "high speed," we mean a press having a linear speed up to about 30 meters/min. for a four-color mode, and about 60 meters/min. for a two-color mode. By "wide format" it is meant that the printers print at a width of 29 to 30 inches (73 to 76 cm). For example, the primer coating used on the polymeric substrates comprising the laminate structure may be applied to substrates which are printed using liquid toners and/or inks suitable for HP Indigo WS6600 or WS6000, 20000 or 30000 Digital Presses. These presses are designed to print substrates used for flexible packaging. Such digital presses also include an optional in-line priming unit which applies primer to uncoated substrates in-line (following a corona treatment) and dries the primer just prior to printing. Thus, the presses are capable of priming and printing substrates in a single pass. Alternatively, the primer coating may be applied to a substrate off-line by conventional flexographic, gravure, or rod coating techniques.

We have unexpectedly found that the bond strength upon lamination of a primed and printed first polymeric substrate to a second substrate is improved even though the primer coating is not present at the surface of the bond, i.e., the primer coated surface is overprinted with ink or toner and then optionally coated with a laminating adhesive. While not wishing to be bound by theory, it is believed that the increased bond strength is obtained as a result of a reaction which occurs between the components in the ink and the primer. The ink components are believed to react with the primer components by an acid-base reaction, where the base function is provided from the amine groups present in the polyethyleneimine chain, and the acid function is provided from the ink (such as HP Indigo inks which are used in the presses described herein).

It has also been found that use of the primer as described herein provides a laminate having improved resistance to heated water infiltration upon immersion of the laminate. For example, when the laminates are used in retort packaging applications, the final packaging may be subjected to immersion in hot water to heat the contents of the package.

Unless otherwise indicated, the disclosure of any ranges in the specification and claims are to be understood as including the range itself and also anything subsumed therein, as well as endpoints.

One embodiment of the primer coating for use on the polymeric substrates forming the laminate structure comprises from about 5 to 20% by weight of polyethyleneimine, from about 0.5 to 5.0% formaldehyde, and the balance deionized water. The polyethyleneimine is preferably supplied in the form of an aqueous solution containing about 50% by weight of the polyethyleneimine but may comprise from 20 to 99 wt %.

A suitable polyethyleneimine solution for use in the primer composition is commercially available from BASF under the designation Polymin® P or Lupasol® P. Other suitable grades of Polymin® polyethyleneimines include Polymin® FG, WF, G20, G35, G100, HF, PS, SK, and SNA. Other polyethyleneimines are available from Nippon Shokubai under the designation EPOMIN and include EPOMIN SP-003, SP-006, SP-012, SP-018, SP-200, SP-110, SP-1000, P-1000, P-1010, and P1050.

The polyethyleneimine acts as an adhesion promoter to achieve good adhesion of the toner and/or ink image to the polymeric substrate. The polyethyleneimine is modified with formaldehyde in water, i.e., the formaldehyde acts to crosslink the polyethyleneimine chains via an aldehyde-ammonia reaction to form a resin which, upon drying, forms a film on the substrates which are coated. It should be appreciated that there are no other components present in the primer composition which could react with the polyethyleneimine other than formaldehyde.

The modified polyethyleneimine renders the primer more water resistant, and consequently, the final laminate structure is water resistant, for example, when subjected to hot water immersion.

The primer coating may further comprise from 0.05 to about 0.1% by weight of a wetting agent, and anti-foaming additives in an amount of from 0.05 to 0.2% by weight.

The primer coating is preferably prepared by adding the polyethyleneimine and formaldehyde to water in a mixing vessel at ambient temperatures. The polyethyleneimine and formaldehyde components react to form a polymer which is known under the designation aziridine, formaldehyde resin (CAS No. 25549-69-3). When the solution of this polymer in water is applied to the surface of a substrate, the water evaporates upon drying to form a film.

The primer coating may be applied to polymeric substrates including polyethylene, biaxially oriented polyethylene terephthalate (BOPET), cast polypropylene (CPP), biaxially oriented polypropylene (BOPP), coextruded polypropylene (COPP), biaxially oriented nylon (BON), biaxially oriented polyamide (BOPA), and any of the above polymers including a metallized coating thereon. The polymeric substrates may range in thickness from about 10 to about 50 μm. The primer is applied to at least one major surface of the substrate which is to receive the toner/ink. Before the primer is applied, the surface of the substrate is preferably treated to ensure that the primer will wet out the surface of the film. The film is preferably treated using conventional techniques such as a flame or corona discharge treatment.

The primer coating is preferably applied as an aqueous solution to at least one major surface of the substrate to form a substantially continuous coating on the surface of the substrate followed by drying the coating. The primer may be applied either inline or offline. For example, the primer may be applied in-line on a press which is fitted with an in-line priming unit. Alternatively, the primer coating may be applied in an offline process using any of a number of known techniques, including gravure or rod coating or flexographic printing. The primer composition is preferably applied to the substrate such that when dried, it forms a substantially continuous film coating having a coat weight of about 0.15 to 0.3 g/m² (resulting in a thickness of from about 0.15 to 0.2 μm).

After the primer coating is applied, it may be dried to a substantially continuous, clear, adherent film by hot air, radiant heat or any other suitable means.

After the primer has dried, the primer coated polymer substrate may then be printed using a digital press as described above using liquid or dry toner or ink. The printed images may take the form of graphic images, words, symbols, or any combination thereof and may cover substantially the entire surface of the substrate or be limited to one or more desired areas thereof.

The primed and printed polymeric substrate is then laminated to a second polymeric substrate. The second substrate may comprise any of the above substrates and may also include multilayer substrates such as aluminum-polyethylene. A lamination adhesive may be applied to the first (primed and printed) substrate surface or to the second polymeric substrate surface prior to lamination. In some embodiments, the second substrate may be corona treated prior to application of the lamination adhesive.

The lamination adhesive may be applied, for example, using a solventless type laminating machine. The adhesive may be applied at a coat weight of from about 1.8 g/m² to about 2.2 g/m², and preferably about 2.0 g/m². Suitable laminating adhesives for use are solvent-free adhesives commercially available from Morchem, Sun Chemical, Henkel, Rohm and Haas, or Bostik. While solvent-free adhesives are preferred for use, it is also possible to use solvent-based adhesives or water-based adhesives. Where solvent-based adhesives are used, the adhesive is preferably applied at a coat weight of about 2.0 to 2.5 g/m². Where water-based adhesives are used, the adhesive is preferably applied at a coat weight of from 1.5 to 2.0 g/m².

Preferred laminate structures formed in accordance with embodiments of the invention include a primed/printed biaxially oriented polyethylene terephthalate (BOPET) substrate laminated to a polyethylene substrate, and a primed/printed biaxially oriented polypropylene laminated to a (second) biaxially oriented polypropylene substrate.

Other possible laminate structures include a primed/printed BOPET film laminated to polyethylene or cast polypropylene, or a primed/printed biaxially oriented polyamide (BOPA) film laminated to polyethylene or cast polypropylene. A primed/printed BOPP film may be laminated to polyethylene, a second BOPP film, or a BOPET metallized film.

Other possible multilayer laminate structures include a primed/printed BOPET film laminated to a multilayer film comprising BOPET and polyethylene or cast polypropylene, or a primed/printed BOPET film laminated to a multilayer film comprising metallized BOPET and polyethylene or cast polypropylene, or a primed/printed BOPET film laminated to a multilayer substrate comprising aluminum foil and polyethylene or cast polypropylene. In all of the above laminates, BOPA primed/printed films may be used in place of BOPET.

Referring now to FIG. 1, a laminate structure 10 in accordance with an embodiment of the invention is schematically shown and includes a first polymeric substrate 12 which has been coated with a primer 14 on one major surface of the substrate. Liquid toner/ink 16 is printed onto primer 14 and dried. A laminating adhesive 18 is supplied over the printed substrate, and a second polymeric substrate 20 is adhered to the laminating adhesive. As will be appreciated, additional polymeric and/or metallic layers may also be present in the overall laminate structure.

The primed and printed laminate structures may be used in a number of packaging applications including stand-up pouches, flat bags, and blisters and strip packs.

In order that the invention may be more readily understood, reference is made to the following example, which is intended to illustrate the invention, but is not to be taken as limiting the scope thereof.

EXAMPLE 1

The following primer compositions were prepared by combining the following components at ambient temperature:

TABLE 1

| Component | Primer A Weight % | Primer B Weight % |
|---|---|---|
| Polyethyleneimine[1] | 8.6 | 18.0 |
| Formaldehyde (37.5%) | 1.9 | 2.72 |
| Water | 89.5 | 79.28 |

[1]Polymin ® P from BASF

Primer A had a solids content of 5% and Primer B had a solids content of 10% (based on the total weight of the primer composition). Both compositions had a pH between about 10 and 12.

The primers were applied to various film substrates (following a corona treatment) including biaxially oriented polyethylene terephthalate, polyethylene, and biaxially oriented polypropylene films. Selected primed substrates were printed with an HP Indigo WS6600 and HP 20000 press using an approved liquid toner composition with a specific image consisting of a series of 24 patches having different colors and toner coverage ranging from 100% to 350%, where toner coverage is specified as a percentage using 100% of each process color (cyan, magenta, yellow, black and white). The total coverage depends on a number of parameters including the printing process, type of substrate, the press speed, and how many colors are printed simultaneously.

Laminate constructions were then formed by adhering the primed and printed substrates to a second polymeric film substrate comprising either polyethylene (PE), biaxially oriented polypropylene (BOPP), or a multilayer substrate comprising aluminum/polyethylene. The resulting laminate structures comprised BOPET/PE, BOPP/BOPP, and BOPET/Al-PE, where the PET film had a thickness of 12 µm, the BOPP film had a thickness of 20 µm, the PE film had a thickness of 90 µm, and the Al-PE film had a thickness of 8 µm (aluminum) and 90 µm (PE). A BOPP/metallized BOPP structure was also formed having a thickness of 30 µm.

The substrates were adhered using solventless or solvent-based lamination adhesives as described below. Prior to application of the lamination adhesive, the second polymeric substrates were corona treated. The lamination adhesives were then applied using a Nordmeccanica labo combi 400 laminating machine.

Lamination was also performed using a Nordmeccanica Labo Combi 400 laminating machine. The lamination bond strength of the laminated structures was then determined using the procedure described in ASTM F88. This is a peel test which determines the "seal strength" of the package, which is defined as the measure of the ability of a package seal to resist separation. The test indicates package integrity as well as the ability of the lamination process to produce consistent seals. A testing technique was used in which a tail of each specimen was secured in opposing grips and the seal was hand-supported at a 90° perpendicular angle to the tails while the test was conducted. Strips of one inch in width were used for measurements. After initiating delamination between the relevant film plies, the average force required to peel the two "legs" of the test pieces was recorded.

Table 2 below illustrates the failure modes observed upon peeling the substrates apart.

Figure 3:
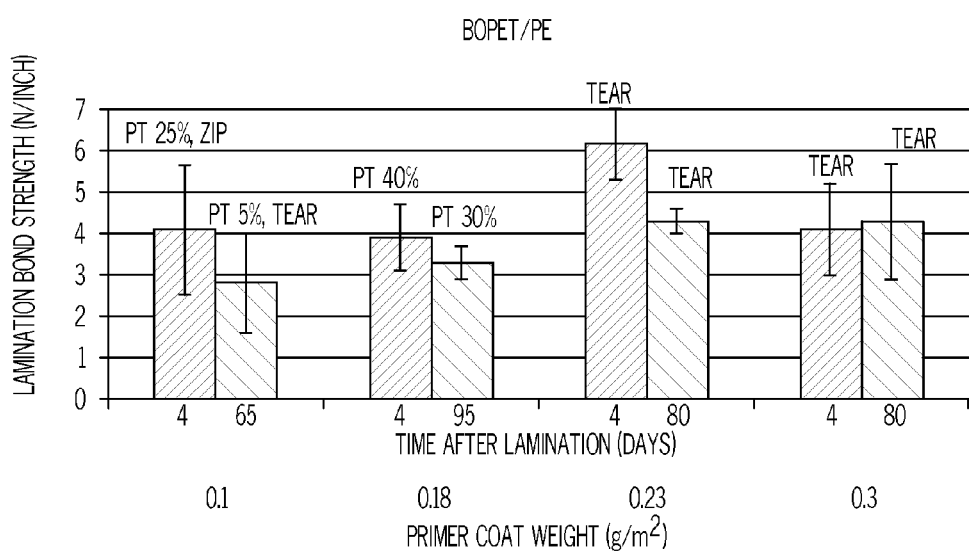
FIG. 3 is a graph illustrating the bond strength of BOPET/PE laminate structures formed in accordance with another embodiment of the invention.

FIG. 3 illustrates the lamination bond strength and failure modes for a biaxially oriented polyethylene terephthalate/polyethylene laminate (BOPET/PE) in which the BOPET film was coated with Primer B, printed (ink coverage of 350%) and adhered to the PE film with a solventless adhesive (DICDRY NS 2100A/HA 210B from DIC Corporation). This adhesive is preferably prepared at a ratio of 100/140 for components A/B in order to obtain optimum lamination bond strength values. The primer was applied at coat weights of 0.1, 018, 0.23, and 0.3 gsm. As can be seen, at higher coat weights, the lamination bond strength remains high 80 days after lamination.

Figure 4:
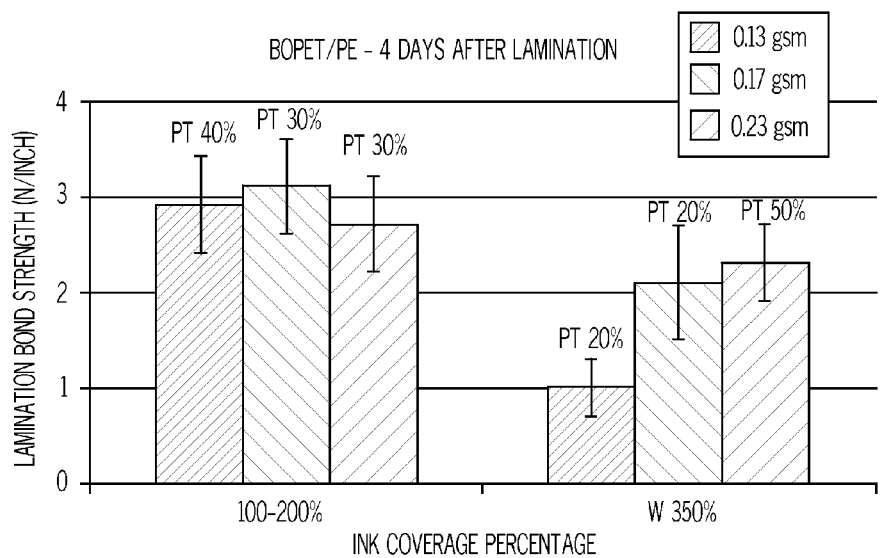
FIG. 4 is a graph illustrating the bond strength of BOPET/PE laminate structures formed in accordance with another embodiment of the invention.

FIG. 4 illustrates the lamination bond strength and failure modes for a biaxially oriented polyethylene terephthate/polyethylene laminate (BOPET/PE) in which the PET film was coated with Primer B, printed, and adhered to the PE film with a solvent-based adhesive (PS 246A/CS90 from Morchem). The primer was printed at coat weights of 0.13 gsm, 0.17 gsm, and 0.23 gsm and the bond strength was measured seven days after lamination.

Figure 5:
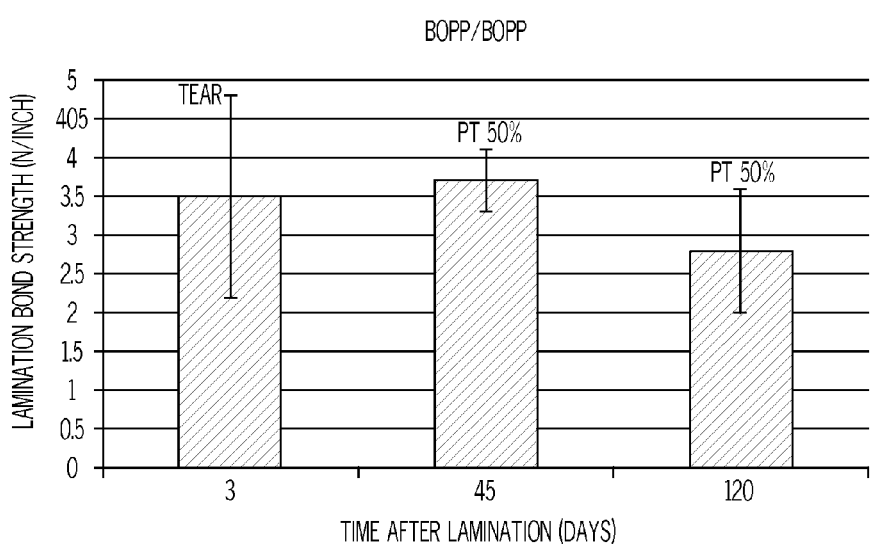
FIG. 5 is a graph illustrating the bond strength of BOPP/BOPP laminate structures formed in accordance with another embodiment of the invention.

FIG. 5 illustrates the lamination bond strength and failure modes for a biaxially oriented polypropylene/biaxially oriented polypropylene (BOPP/BOPP) laminate in which the first BOPP film was coated with Primer B, printed (350% ink coverage), and adhered to the second BOPP film with a solventless adhesive (PL 272A/CF72 from Morchem). The primer was printed at a coat weight of 0.18 gsm.

Figure 6:
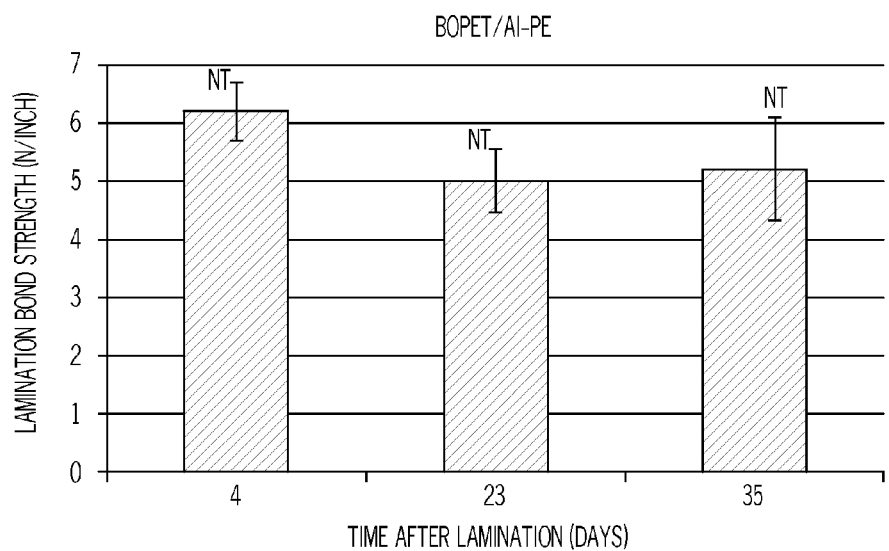
FIG. 6 is a graph illustrating the bond strength of BOPET/Al-PE laminate structures formed in accordance with another embodiment of the invention.

FIG. 6 illustrates the lamination bond strength and failure modes for a biaxially oriented polyethylene terephthalate/aluminum-polyethylene (BOPET/Al-PE) laminate in which the BOPET film was coated with Primer B, printed (350% ink coverage), and adhered to the Al-PE film with a solventless adhesive (DICDRY NS 2100A/HA 210B from DIC Corporation). The primer was printed at a coat weight of 0.18 gsm.

Figure 7:
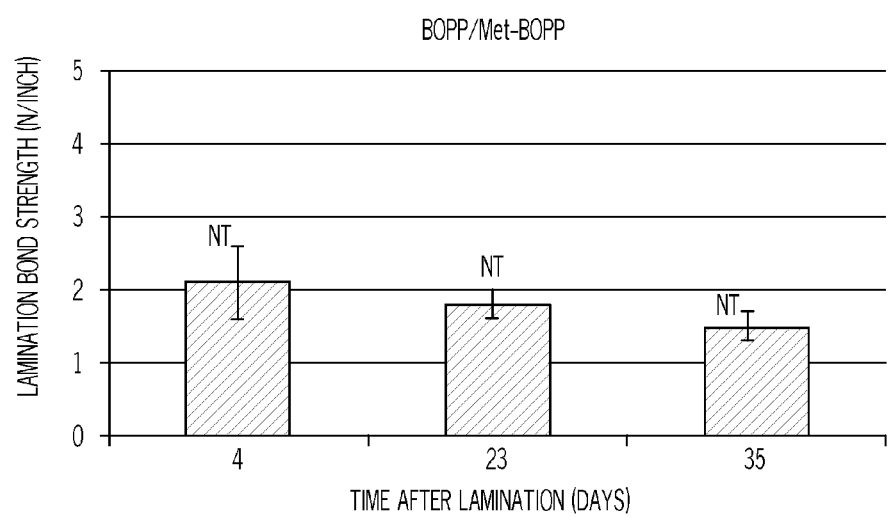
FIG. 7 is a graph illustrating the bond strength of BOPP/Metallized BOPP laminate structures formed in accordance with another embodiment of the invention.

FIG. 7 illustrates the lamination bond strength and failure modes for a biaxially oriented polypropylene/metallized biaxially oriented polypropylene laminate (BOPP/met-BOPP) in which the BOPP film was coated with Primer B, printed (350% ink coverage), and adhered to the metallized BOPP film with a solventless adhesive (DICDRY NS 2100A/HA 210B from DIC Corporation).

EXAMPLE 2

The primer compositions of Example 1 and a separate coating of neat polyethyleneimine were applied to a first

TABLE 2

| Tear (Film Tear) | NT (Non Transfer) | PT (Partial Transfer) | TT (Total Transfer) |
|---|---|---|---|
| Film tear is observed during peeling of either the first or second substrate | Upon peeling, ink layer remains on the first polymeric substrate | Upon peeling, part of the ink layer remains on the first polymeric substrate and splits to the second polymeric substrate | Upon peeling, all ink layers remain on the second polymeric substrate |

Figure 2:
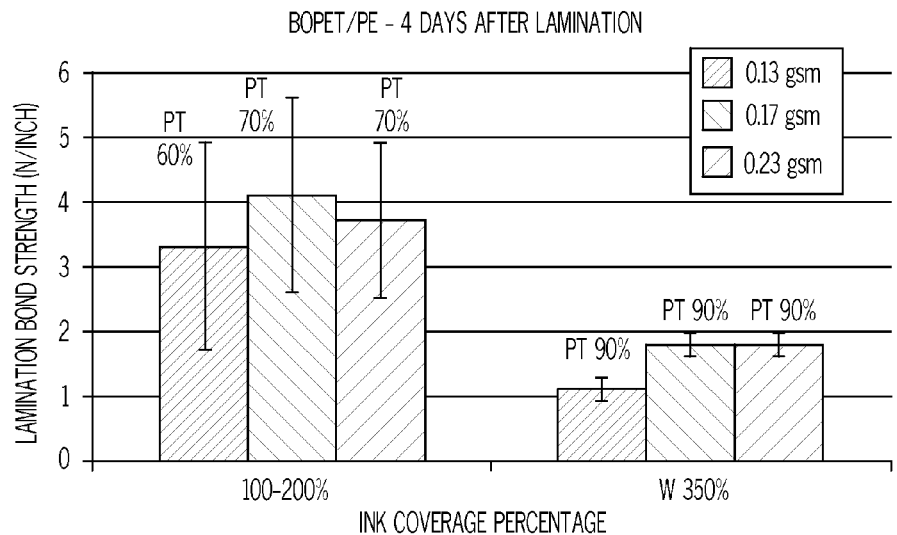
FIG. 2 is a graph illustrating the bond strength of BOPET/PE laminate structures formed in accordance with an embodiment of the invention.

FIG. 2 illustrates the lamination bond strength and failure mode for a biaxially oriented polyethylene terephthalate/polyethylene (BOPET/PE) laminate in which BOPET was coated with Primer B, printed, and adhered to the PE substrate with a solventless adhesive (PL 272A/CF72 from Morchem). The primer was applied at coat weights of 0.13, 0.17, and 0.23 gsm. As can be seen, for substrates having ink coverage of 100-200%, the lamination bond strength is greater than 3.5 N/inch.

polymeric substrate (BOPET or BOPP) and then laminated to a second polymeric substrate (polyethyene) without the application of a laminating adhesive. The substrates were laminated at a heat seal temperature of 135° C. using heated metal jaws at a pressure of 40 PSI for 1.5 seconds.

The formed laminates were then subjected to a peel test pursuant to ASTM F88 with and without being subjected to immersion in water and alcohol at room temperature. The results are shown below in Tables 3-6.

TABLE 3

BOPET/PE laminate
(Primer coat weight 0.2 g/m²)

| Primer | Polyethylene imine (neat) | Primer A | Primer B |
|---|---|---|---|
| No immersion | 5.75 | 6.22 | 5.32 |
| 1 hour immersion in water | 0.02 | 0.28 | 0.03 |
| 1 hour immersion in isopropylic alcohol | 0.019 | 1.9 | 1.36 |

Bond strength (N/inch)

TABLE 4

BOPET/PE laminate
(Primer coat weight 0.05 g/m²)

| Primer | Polyethylene imine (neat) | Primer A | Primer B |
|---|---|---|---|
| 1 hour immersion in water | 0.08 | 0.41 | 0.42 |

Bond strength (N/inch)

TABLE 5

BOPP/PE laminate
(Primer coat weight 0.2 g/m²)

| Primer | Polyethylene imine (neat) | Primer A | Primer B |
|---|---|---|---|
| No immersion | 7.89 | 8.72 | 7.78 |
| 1 hour immersion in water | 0.02 | 1.85 | 0.061 |

Bond strength (N/inch)

TABLE 6

BOPP/PE laminate
(Primer coat weight 0.05 g/m²)

| Primer | Polyethylene imine (neat) | Primer A | Primer B |
|---|---|---|---|
| No immersion | 7.46 | 7.28 | 8.22 |
| 1 hour immersion in water | 1.54 | 8.55 | 2.91 |

Bond strength (N/inch)

As can be seen, the laminates including the primer compositions of the invention exhibited higher bond strength after immersion than the substrates/laminates which were treated with PEI alone.

Having described the invention in detail and by reference to preferred embodiments thereof, it will be apparent that modifications and variations are possible without departing from the scope of the invention.

What is claimed is:

1. A laminate structure comprising first and second polymeric substrates each having first and second major surfaces, wherein at least one major surface of said first polymeric substrate includes a primer coating thereon formed from a primer composition consisting of polyethyleneimine, formaldehyde, and water; wherein the primer composition is applied to said first polymeric substrate and dried to form the primer coating, wherein the primer coating is the reaction product of polyethyleneimine and formaldehyde, and a toner or ink image printed on said first polymeric substrate over said primer coating; and wherein said first polymeric substrate is laminated to said second polymeric substrate at the at least one major surface including said primer coating and said toner or ink image.

2. The laminate structure of claim 1 further including a laminating adhesive over the toner or ink image.

3. The laminate structure of claim 1 wherein said first and second polymeric substrates are selected from polyethylene, biaxially oriented polyethylene terephthalate (BOPET), biaxially oriented polypropylene (BOPP), cast polypropylene (CPP), coextruded polypropylene (COPP), biaxially oriented nylon (BON), and biaxially oriented polyamide (BOPA).

4. The laminate structure of claim 3 wherein said first polymeric substrate comprises BOPET and said second polymeric substrate comprises polyethylene or cast polypropylene.

5. The laminate structure of claim 3 wherein said first polymeric substrate comprises BOPA and said second polymeric substrate comprises polyethylene or cast polypropylene.

6. The laminate structure of claim 1 wherein said first polymeric substrate comprises BOPP and said second polymeric substrate comprises polyethylene, BOPP, or a BOPET metallized film.

7. The laminate structure of claim 3 wherein said first polymeric substrate comprises BOPET and said second polymeric substrate is a multilayer film comprising BOPET and one of polyethylene or cast polypropylene.

8. The laminate structure of claim 1 wherein said first polymeric substrate comprises BOPET and said second polymeric substrate comprises a multilayer film comprising metallized BOPET and one of polyethylene or cast polypropylene.

9. The laminate structure of claim 1 wherein said first polymeric substrate comprises BOPET and said second polymeric substrate comprises a multilayer substrate comprising aluminum foil and one of polyethylene or cast polypropylene.

10. A coated polymeric substrate comprising a polymeric substrate having first and second major surfaces, wherein at least one major surface of said polymeric substrate includes a primer coating thereon formed from a primer composition consisting of polyethyleneimine, formaldehyde, and water; wherein the primer composition is applied to said first major surface of said polymeric substrate and dried to form the primer coating, wherein the primer coating is the reaction product of polyethyleneimine and formaldehyde, and a toner or ink image printed on said polymeric substrate over said primer coating.

11. A laminate structure comprising first and second polymeric substrates each having first and second major surfaces, wherein at least one major surface of said first polymeric substrate includes a primer coating thereon formed from a primer composition consisting of polyethyleneimine, formaldehyde, and water; wherein the primer composition is applied to said first polymeric substrate dried to form the primer coating, wherein the primer coating is a crosslinked polyethyleneimine resin, and a toner or ink image printed on said first polymeric substrate over said primer coating; wherein said first polymeric substrate is laminated to said second polymeric substrate at the at least one major surface including said primer coating and said toner or ink image; and wherein amine groups in said polyethyleneimine react with acid groups in said toner or ink to increase the bond strength of said laminate.

12. The laminate structure of claim 11 further including a laminating adhesive over the toner or ink image.

13. The laminate structure of claim 11 wherein said first and second polymeric substrates are selected from polyethylene, biaxially oriented polyethylene terephthalate (BOPET), biaxially oriented polypropylene (BOPP), cast polypropylene (CPP), coextruded polypropylene (COPP), biaxially oriented nylon (BON), and biaxially oriented polyamide (BOPA).

14. The laminate structure of claim 13 wherein said first polymeric substrate comprises BOPET or BOPA and said second polymeric substrate comprises polyethylene or cast polypropylene.

15. The laminate structure of claim 11 wherein said first polymeric substrate comprises BOPP and said second polymeric substrate comprises polyethylene, BOPP, or a BOPET metallized film.

16. The laminate structure of claim 11 wherein said first polymeric substrate comprises BOPET and said second polymeric substrate is one of a multilayer film comprising BOPET and polyethylene, a multilayer film comprising metallized BOPET and polyethylene, and a multilayer film comprising aluminum foil and one of polyethylene, or cast polypropylene.

17. A coated polymeric substrate comprising a polymeric substrate having first and second major surfaces, wherein at least one major surface of said polymeric substrate includes a primer coating thereon formed from a primer composition consisting of polyethyleneimine, formaldehyde, and water; wherein the primer composition is applied to said first polymeric substrate and dried to form the primer coating, wherein the primer coating is a crosslinked polyethyleneimine resin, and a toner or ink image printed on said polymeric substrate over said primer coating, and wherein amine groups in said polyethyleneimine react with acid groups in said toner or ink to increase the bond strength of said laminate.

18. A laminate structure comprising:

a first polymeric substrate having first and second major surfaces, wherein at least one major surface of said first polymeric substrate includes a primer coating thereon formed from a primer compositision consisting of polyethyleneimine, formaldehyde, and water; wherein the primer composition is applied to said first polymeric substrate and dried to form the primer coating, wherein the primer coating is a crosslinked polyethyleneimine resin, and a toner or ink image printed on said first polymeric substrate over said primer coating; and a second polymeric substrate laminated to at the at least one major surface of the first polymeric substrate which includes the primer coating and the toner or ink image.

19. The laminate structure of claim 18 including a laminating adhesive over the toner or ink image.

20. The laminate structure of claim 18 wherein the first polymeric substrate and the second polymeric substrate are selected from polyethylene, biaxially oriented polyethylene terephthalate (BOPET), biaxially oriented polypropylene (BOPP), cast polypropylene (CPP), coextruded polypropylene (COPP), biaxially oriented nylon (BON), and biaxially oriented polyamide (BOPA).

21. The laminate structure of claim 20 wherein the first polymeric substrate comprises BOPET or BOPA and the second polymeric substrate comprises polyethylene or cast polypropylene.

22. The laminate structure of claim 18 wherein the first polymeric substrate comprises BOPP and the second polymeric substrate comprises polyethylene, BOPP, or a BOPET metalized film.

23. The laminate structure of claim 18 wherein the first polymeric substrate comprises BOPET and the second polymeric substrate is a multilayer film comprising one of BOPET, metalized BOPET, or aluminum foil, and one of polyethylene, or cast polypropylene.

* * * * *